United States Patent [19]

Davis et al.

[11] Patent Number: 5,166,507
[45] Date of Patent: Nov. 24, 1992

[54] LIDAR COUNTERMEASURE USING AMPLITUDE AND PHASE FRONT MODULATION AND DEGENERATE FOUR-WAVE MIXING

[75] Inventors: Dennis W. Davis, Boca Raton; William F. Conley, Hollywood; Donald J. Link, Jupiter, all of Fla.

[73] Assignee: United Technologies Corporation, Hartford, Conn.

[21] Appl. No.: 829,800

[22] Filed: Jan. 31, 1992

[51] Int. Cl.$^5$ .............................................. G01J 1/20
[52] U.S. Cl. .................................. 250/201.9; 356/121
[58] Field of Search ............... 250/201.9, 203.1, 203.6, 250/551, 556; 359/111, 299, 300; 89/1.11; 330/4; 356/1, 4, 5, 121

[56] References Cited

U.S. PATENT DOCUMENTS

| | | | |
|---|---|---|---|
| 4,005,935 | 2/1977 | Wang | 356/5 |
| 4,006,478 | 2/1977 | Lewis et al. | 342/15 |
| 4,761,059 | 8/1988 | Yeh et al. | 359/299 |
| 4,921,335 | 5/1990 | Ditman, Jr. | 359/241 |

FOREIGN PATENT DOCUMENTS 0161799 12/1979 Japan .

Primary Examiner—David C. Nelms
Assistant Examiner—John R. Lee
Attorney, Agent, or Firm—Peter R. Ruzek

[57] ABSTRACT

A lider countermeasure receives an interrogating laser beam and returns a beam having a distorted phase point such that the interrogating system generates a false angular portion for the returned radiation. The false phase front is achieved by independent manipulations of the amplitude and phase of the returned signal.

9 Claims, 3 Drawing Sheets

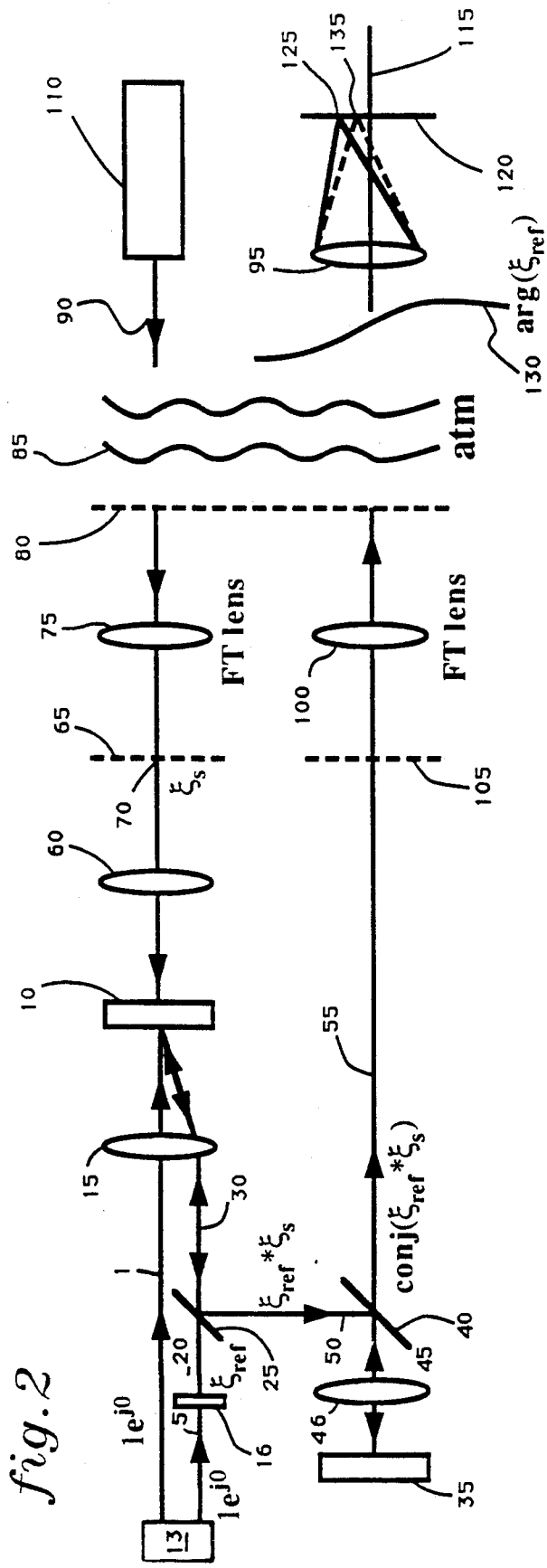
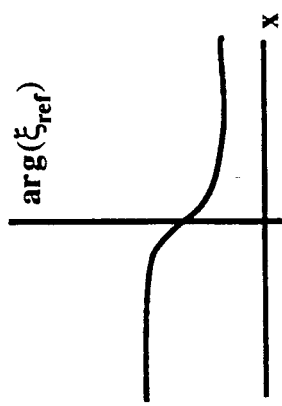
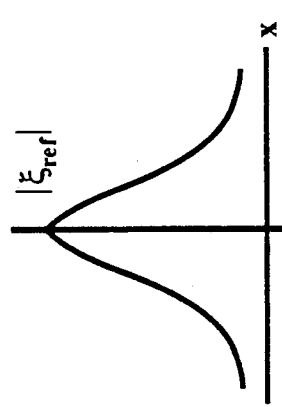
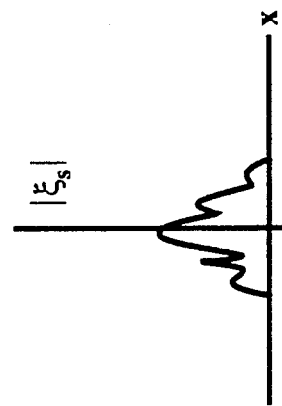

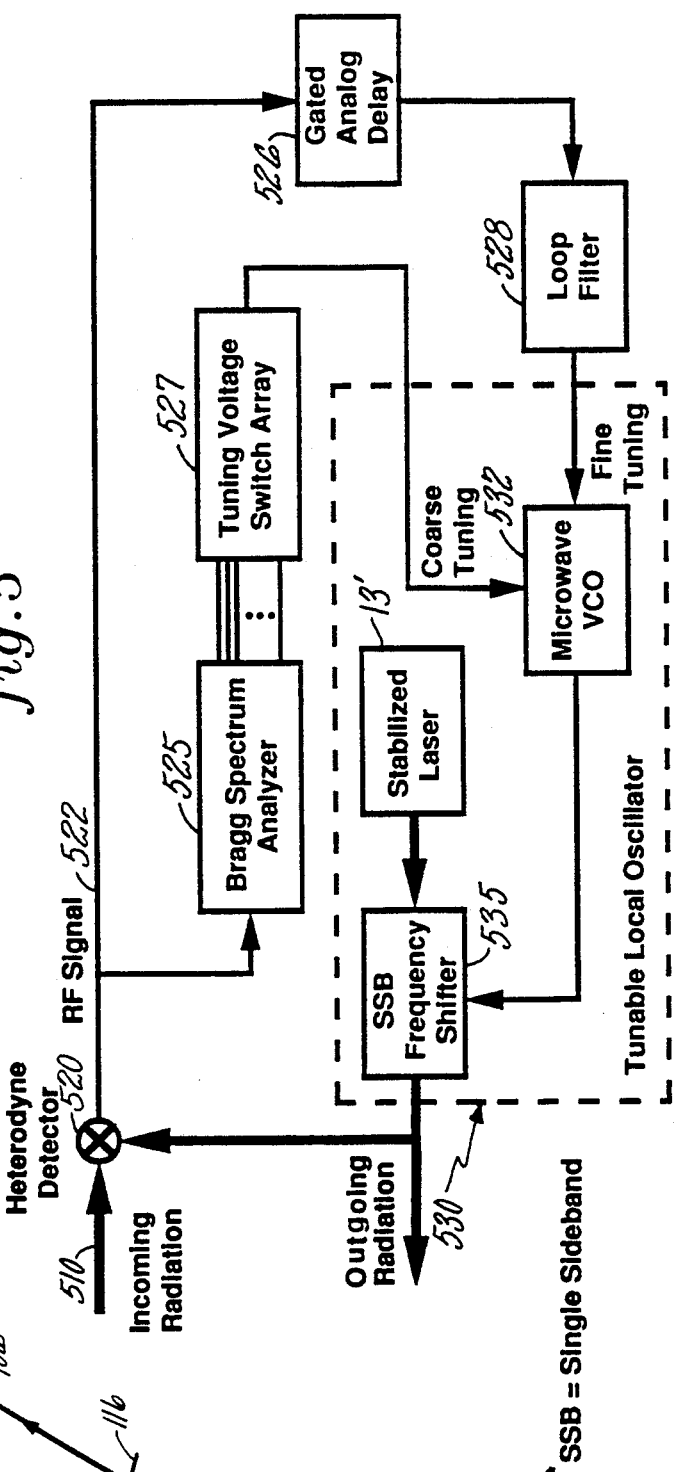
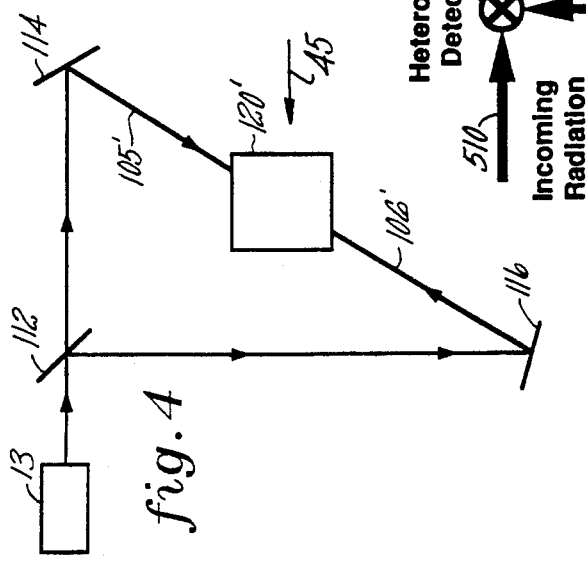

LIDAR COUNTERMEASURE USING AMPLITUDE AND PHASE FRONT MODULATION AND DEGENERATE FOUR-WAVE MIXING

CROSS REFERENCE TO RELATED APPLICATIONS

This application is related to the subject matter disclosed and claimed in copending U.S. Ser. No. 07/829,793 entitled Fast Acquisition Optical Frequency Locked Loop by Dennis W. Davis and Stanley Scalise filed on even date herewith and assigned to the same assignee herein incorporated by reference.

TECHNICAL FIELD

The field of the invention is that of optical countermeasures for lidar (light detection and ranging), sometimes referred to as laser radar.

BACKGROUND ART

In the field of microwave radar, there has long been used the "cross-eye" technique (U.S. Pat. No. 4,006,478), in which an interrogating radar signal is deceived by returning a distorted signal having a discontinuity or other alteration in the phase front so that it appears to be coming from a different point in space. The art has long sought an equivalent for laser radar.

Disclosure of the Invention

The invention relates to an apparatus for returning a deceptive lidar signal in which the phase and the amplitude of the incoming optical beam are modulated independently and the final beam is returned by degenerate four wave mixing (DFWM) to provide the required return signal.

Other features and advantages will be apparent from the specification and claims and from the accompanying drawings which illustrate an embodiment of the invention.

BRIEF DESCRIPTION OF DRAWINGS

FIG. 2 illustrates in partially schematic, partially pictorial fashion an alternative embodiment of the invention that provides compensation for atmospheric distortion.

FIG. 3 shows an atmospheric point spread function and various wavefront parameters.

FIG. 4 illustrates a unit in FIG. 2.

FIG. 5 illustrates a laser control system for use with the invention.

BEST MODE FOR CARRYING OUT THE INVENTION

Figure 1:
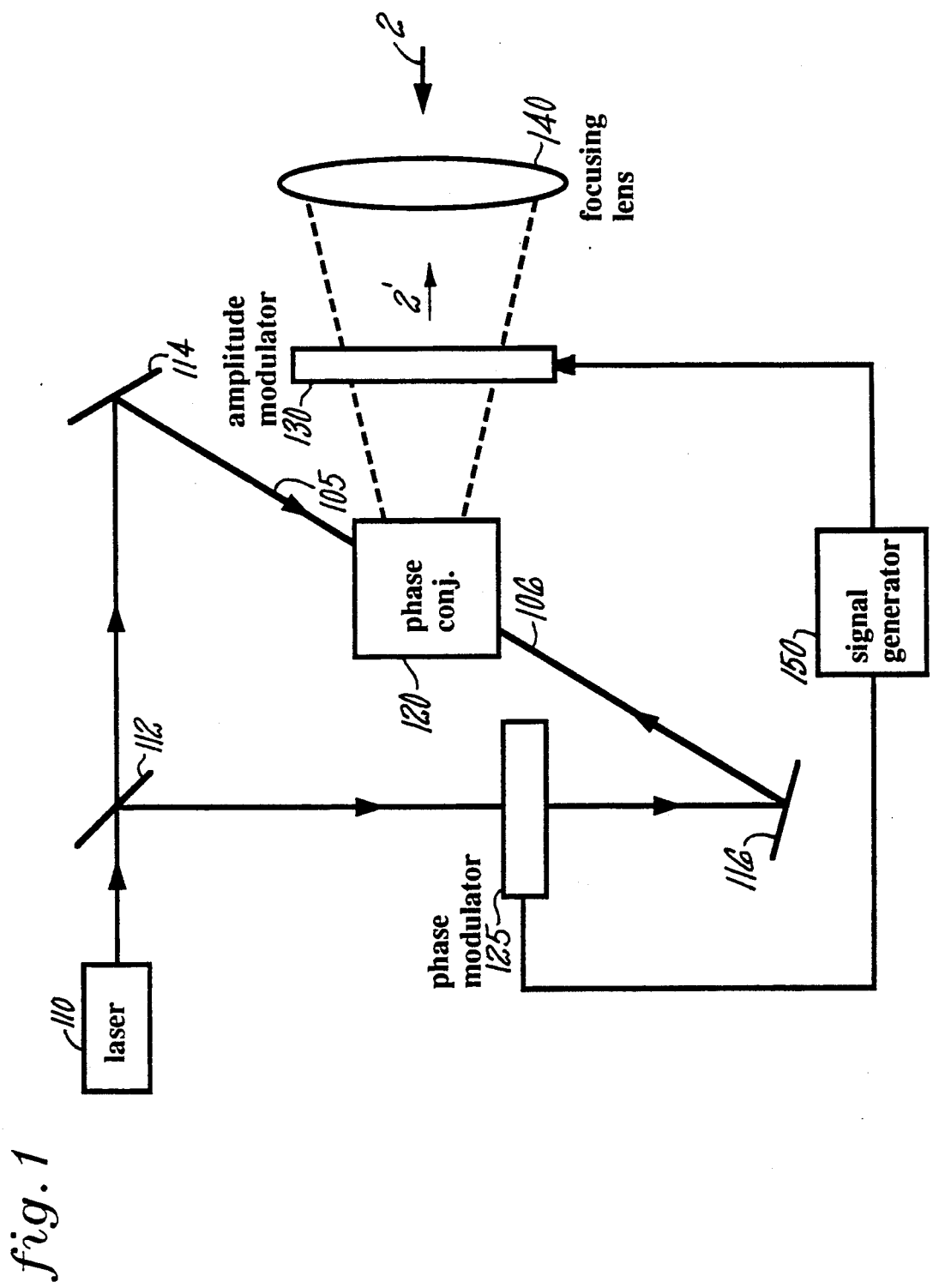
FIG. 1 illustrates in partially schematic, partially pictorial fashion an embodiment of the invention.

Referring to FIG. 1, there is shown an incoming optical beam 2 from a tracking station or other installation for which it is desired to send a deceptive return beam. Beam 2 passes through an initial lens 140, amplitude modulator 130, and is focused into phase conjugator 120 in which a return beam 2' having a deceptive phase and amplitude modulation will be generated by the four wave mixing technique using incoming beams 105 and 106.

Pump beams 105 and 106 are generated by laser 110 which produces a collimated beam that is divided by beam splitter 112 into two pump beams. A planar pump beam 105 is deflected by mirror 114 into conjugator 120. The other pump beam 106 is modulated by phase modulator 125, which impresses some desired phase distribution, such as a linear change in phase extending across the beam without changing the amplitude.

Modulator 125 may be a phase-only holographic emulsion with a fixed phase profile that will provide a desired phase kink in the received field or a variable phase modulation device having a minimal parasitic amplitude effect. One such framing modulator is a conventional thin linear electro-optic crystal through which the light transits. Transparent pixel electrodes on the face of the crystal are targets for charge packet deposition by a raster scanned electron beam under control of signal generator 150. The local electric field due to the deposited charge modifies the index of refraction and hence the phase delay of light transiting each pixel region. Similarly, amplitude modulator 130 could be a neutral density filter mask or any of a number of spatial light modulators.

The phase modulated beam 106 from modulator 125 is reflected by mirror 116 up into crystal 120. The two beams 105 and 106 form the pump beams for the mixing process and incoming beam 2 provides the probe beam. Beam 2 is modulated in amplitude by modulator 130. This modulation may be fixed in a neutral density filter or a piece of film or it may be variable under control of signal generator 150. In the variable case, a spatial light modulator, such as an addressable liquid crystal display, imposes a desired pattern of amplitude variation across the beam front. The amplitude and/or phase modification pattern may be stored in signal generator 150 which may control both phase modulator 125 and amplitude modulator 130. Signal generator 150 may be a memory device that generates signals in a raster format such as those used in television screens, computer display and the like. It may be a general purpose or special purpose computer having a solid state memory, or any other suitable storage device.

An important advantage of this invention is that since the modulator 130 will not be optically perfect, it will impart some distortion in phase to beam 10. This distortion will be conjugated in the four wave mixing process in crystal 120 and subsequently undone as the conjugate return wave 2' traverses modulator 130, so that it is not necessary to have a high quality modulator at 130.

The four wave mixing process is well known to those skilled in the art. The parameters should be adjusted so that there is net gain so that the return signal coming out of system 100 is greater in amplitude than any passive reflections coming from the rest of the platform on which system 100 is mounted. The apparatus shown in FIG. 1 and FIG. 4 will be referred to as a DFWM means which may or may not include the modulator optics.

An important advantage of the invention is that the phase and amplitude are separately controllable. This is necessary in order to impart an appropriate near field amplitude and phase distribution on the return beam that will produce a deceptive phase distribution at the receiver.

Referring now to FIG. 2, there is shown an embodiment of the invention adapted for endoatmospheric propagation. An illuminating lidar or similar active coherent sensor 110 is shown projecting a laser beam 90 that may transit anywhere from 1 to 10 kilometers of turbulent atmosphere 85 prior to reaching the target plane 80. The requirement for successful deception in this case is that the return beam not only have a deceptive kink in the phase front, but also that it be manipulated to compensate for the distortion induced by the atmosphere, so that the beam returned to the interrogating system has the desired phase front.

Within the inventive system, the field at plane 80 is Fourier-transformed by lens 75 so that at the transform plane 65 the field 70 ($\xi_s$) is the point spread function of the atmosphere along the beam path. The remainder of the system to the left of planes 65 and 105 serves to impose the desired phase and amplitude manipulations of the previous embodiment and also to generate a field that will pre-compensate for the degrading effects of the atmosphere so that the field arriving at lens 95 on the interrogating platform will have the desired profile.

This compensation requires information about the desired phase front and about the atmosphere. The atmospheric point spread function represents the effect of the atmosphere on a beam propagating through it.

In the absence of an atmosphere, the point spread function would be a spatial impulse. The effect of the atmosphere is to spread the function as in FIG. 3a. Unit 16, which may be a system illustrated in FIG. 1, impresses the desired phase and amplitude distribution on the beam 5 entering on the left from local oscillator 13. For simplicity in the drawing, beam splitter, and associated mirror to direct the pump and probe beam are all contained in box 16. The two sets of information may be combined by convolving the point spread function with the desired phase front described as having a magnitude $|\xi_{ref}|$ and phase arg ($\xi_{ref}$) shown in FIGS. 3b and 3c, respectively. As taught in Yariv and White, the convolution may be effected by appropriate use of DFWM. Reference laser 13 generates a plane wave that travels along beam 1 and is used as one pump beam to DFWM cell 10, illustratively a cell containing carbon tetrachloride ($CCl_4$) for $10\mu$ radiation. The other pump beam carries the atmospheric point spread function impressed on beam 70. Beam 5 from unit 16 carrying the desired phase front $\xi_{ref}$ serves as the probe beam to the DFWM process. Lenses 15 and 60 focus the beams on to medium 10.

The DFWM output beam carrying the complex modulation $\xi_{ref}^* \xi_s$ (the convolution of $\xi_{ref}$ with $\xi_s$) emerges from cell 10 and travels along beam 30. It is deflected by beam splitter 25 and directed along beam path 50 to beam splitter 40. This modified lidar illumination must be conjugated so that the energy in beam path 50 will be retrodirected to the illuminating lidar in such a way that the effect of the atmospheric turbulence (as represented by $\xi_s$) will be undone. The section of the apparatus to the left of beam splitter 40 serves to conjugate the beam travelling along beam 50.

Beam 45 is deflected to the left and focused by lens 46 into phase conjugator 35, illustratively another DFWM cell of carbon tetrachloride, which generates a conjugate beam 55 travelling to the right. Phase conjugator 35 also accepts pump beams from laser 13 that are omitted from the drawing for simplicity. This conjugate beam 55 is Fourier transformed by output lens 100 so as to be in the same farfield domain of the lidar as the incident illumination (plane 80). It travels back to the interrogating platform where it is accepted by input lens 95 and focused at an incorrect location 125 on focal plane 120. The combination of lens 75 and lens 100 will be referred to as the input/output means. Those skilled in the art will appreciate that a single lens may be used with an additional beam splitter and other optical transport elements.

It is not necessary that the convolution and conjugation be performed in that order and the reverse order may also be used.

The DFWM apparatus of FIG. 4 may be used as conjugator 35. Laser 13 is the same laser 13 that is used for the DFWM operation in conjugator 10. The remainder of the apparatus is the same as that of FIG. 1 with the phase and amplitude modification removed. One advantage of the present invention is that gain can be incorporated in the system by suitable adjustment of the DFWM parameters as is known in the art, but the system will not act as a beacon for interrogating radiation that is too far off in frequency. A danger that is present in active countermeasures (that incorporate gain) is that if the deception does not work, the return radiation acts as a beacon. Since the DFWM process inherently has a sharply peaked frequency response curve, off-frequency radiation will not stimulate the generation of return radiation; i.e. either the system works by generating appropriately distorted radiation or is passive. It does not emit as a beacon.

When the wavelength of interrogating radiation is known, laser 13 will be pre-set to the same wavelength for improved efficiency. Advantageously, laser 13 is controllable in frequency to respond to incoming radiation over the broadest possible range. One example 23 of laser 13 including a control system is a fast-acquisition optical frequency locked loop, such as that shown schematically in FIG. 5. Such responsive systems adjust the local oscillator laser frequency to match the line on which the interrogating radiation is oscillating to provide a return signal of maximum strength. The return wavelength need not be an exact match, since the interrogating system with have to accommodate a wavelength band of 100's of Megahertz to allow for drift in its own laser and also for Doppler effects.

As can be seen in FIG. 5, incoming radiation 510 enters from the left and is mixed with loop radiation in heterodyne detector 520. The rf output signal representing the difference in frequency between the incoming radiation and the loop output passes into the loop on line 522 and enters both Bragg spectrum analyzer 525 and gated analog delay 526. The output of the analyzer 525 passes into tuning switch array 527, which feeds a dc coarse tuning voltage into voltage controlled oscillator 532, depending on which channel in the spectrum analyzer has been excited. Simultaneously, the beat frequency from mixer 520 is delayed, filtered in loop filter 528 and applied to a fine tuning input of voltage controlled oscillator 532, so that a vernier tuning is produced that adjusts the high speed coarse tuning provided by the Bragg spectrum analyzer.

Voltage controlled oscillator 532 is part of a tunable local oscillator 530 that also incorporates laser and single sideband frequency shifter 535. The output from this unit is an optical frequency that is produced by passing the stable reference laser signal through an electro-optical modulator that is modulated by the output of oscillator 532. With the use of single sideband frequency shifters, the local oscillator can match the incoming radiation in a time that is in the range of hundreds of nanoseconds, which is two orders of magnitude faster than conventional techniques. Further details can be found in copending U.S. Pat. application Ser. No. 07/829,793, assigned to the assignee hereof and incorporated herein by reference.

Another embodiment employs a broad-band ammonia gain cell in the local oscillator, which offers a gain-bandwidth product in excess of 100 gigahertz. A suitable system is illustrated in CLEO/90 CTUB8, by J. D. White et al.

Attractive DFWM media for the near infrared include various alkali metal vapors such as Cs and Rb. In a resonant mode, a Cs cell has provided 50% phase conjugate reflectivity using low pump power (<30 milliwatts) and demonstrating a response time of tens of nanoseconds (M. Oria, D. Bloch, M. Fichet and M. Ducloy "Efficient phase conjugation of CW low power laser diode in a short Cs vapor cell at 852 nm," Opt. Lett. Vol 14 #19). At 10 microns, low power CW phase conjugation is achievable at high efficiency in absorbing media with thermal nonlinearities, such as carbon tetrachloride ($CCl_4$). With a pump wave intensity of 100 watts/$cm^2$ delivered by a $CO_2$ laser a power reflectivity of 100% was demonstrated with this fluid. By adjusting the angle between the interacting waves, the response time can be on the order of submicroseconds (V. I. Bespolov, et al "Phase Conjugation of $CO_2$ Laser Radiation in a Medium with Thermal Nonlinearity", IEEE Journal of Quantum Electronics Vol 25, No. 3, Mar. 89). Those skilled in the art will readily be able to apply the teaching herein to shorter wavelengths.

It should be understood that the invention is not limited to the particular embodiments shown and described herein, but that various changes and modifications may be made without departing from the spirit and scope of this novel concept as defined by the following claims.

What is claimed is:

1. An optical system, located at a target location, for receiving interrogating optical radiation from an interrogating system, having an interrogating wavelength, and for returning a signal substantially on said interrogating wavelength with a return near-field amplitude and near-field phase front, said near-field amplitude and near-field phase front being adapted to present in the far field a far field signal having a distorted phase front such that said interrogating system will receive an indication of a false target location, comprising:

input/output means for passing said interrogating radiation into said optical system and for transmitting return radiation back to said interrogating system; and optical processing means responsive to input radiation from said input/output means, for modulating said input radiation with said return near-field amplitude and near-field phase front and for conjugating radiation to be returned, in which;

said optical processing means includes first and second DFWM means for modulating radiation, one of said first and second DFWM means being adapted to generate in response to a wavefront a first modified wavefront carrying a predetermined deceptive phase distribution and for propagating said modified wavefront to further optical means, and the other of said first and second DFWM means for generating a second modified wavefront compensated for atmospheric distortion and propagating said second modified wavefront to other optical means; and said input/output means includes means for receiving interrogating radiation travelling along a first axis and for propagating return radiation along said first axis, said input/output means also performing a transformation of said interrogating radiation to the Fourier domain to form a transformed wavefront carrying a phase distribution characteristic of said interrogating radiation and propagating such transformed incoming Fourier radiation to said optical processing means and intercepting a processed optical wavefront from said optical processing means and transforming said processed wavefront to the spatial domain as an output wavefront, whereby said system directs said output wavefront back to said interrogating system with said near-field wavefront.

2. A system according to claim 1, in which said input/output means includes a Fourier lens for accepting incident radiation and for transmitting return radiation.

3. A system according to claim 1, in which said input/output means includes an input Fourier lens for accepting incident radiation and an output Fourier lens for transmitting return radiation.

4. An optical system according to claim 2, further comprising laser control means for controlling a reference laser having a reference laser wavelength in said optical processing means, said laser control means including means for controlling said reference laser wavelength to match said interrogating wavelength, whereby the operation of said DFWM means is enhanced.

5. An optical system according to claim 3, further comprising laser control means for controlling a reference laser having a reference laser wavelength in said optical processing means, said laser control means including means for controlling said reference laser wavelength to match said interrogating wavelength, whereby the operation of said DFWM means is enhanced.

6. An optical system, located at a target location, for receiving interrogating optical radiation from an interrogating system, having an interrogating wavelength, and for returning a signal substantially on said interrogating wavelength with a return near-field amplitude and near-field phase front, said near-field amplitude and near-field phase front being adapted to present in the far field a far field signal having a distorted phase front such that said interrogating system will receiving an indication of a false target location, comprising:

an input Fourier transform lens for receiving interrogating radiation travelling along a first axis and for transforming said interrogating radiation to the Fourier domain to form a transformed wavefront carrying a phase distribution characteristic of said interrogating radiation and propagating such transformed incoming Fourier radiation to optical processing means;

Amplitude modulation means disposed along said first axis, for impressing a predetermined amplitude modulation pattern on radiation passing therethrough;

a DFWM medium, responsive to said transformed incoming Fourier radiation for generating in response thereto a modified wavefront carrying a predetermined deceptive phase distribution and for propagating said modified wavefront back to said Fourier transform lens, whereby said Fourier transform lens transforms said modified wavefront to the spatial domain as an output wavefront and propagates said output wavefront along said first axis, so that said system directs said output wavefront back to said interrogating system with said near-field wavefront;

a local laser operating on a predetermined optical wavelength for generating first and second optical beams for use in said DFWM medium;

optical transport means for transporting said first and second optical beams to said DFWM medium; and phase modulation means disposed to intercept one of said first and second optical beams, for impressing on said one of said first and second optical beams a predetermined phase pattern adapted to produce said distorted phase front at said interrogating system.

7. An optical system according to claim 6, in which said phase modulating means includes means for presenting a variable phase modulation pattern.

8. An optical system according to claim 6, in which said amplitude modulating means includes means for presenting a variable amplitude modulation pattern.

9. An optical system according to claim 6, in which said phase modulating means includes means for presenting a variable phase modulation pattern and said amplitude modulating means includes means for presenting a variable amplitude modulation pattern.

* * * * *